(12) United States Patent
Kurotsu

(10) Patent No.: US 6,617,916 B1
(45) Date of Patent: Sep. 9, 2003

(54) SEMICONDUCTOR INTEGRATED CIRCUIT

(75) Inventor: Satoru Kurotsu, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/610,615

(22) Filed: Jul. 5, 2000

(30) Foreign Application Priority Data

Mar. 27, 2000 (JP) ........................................ 2000/086219

(51) Int. Cl.$^7$ .............................. G05F 3/02; G05F 1/10
(52) U.S. Cl. ...................................... 327/544; 327/530
(58) Field of Search ................................ 327/544, 530, 327/540, 541, 543, 229; 365/226, 227

(56) References Cited

U.S. PATENT DOCUMENTS

| | | | | |
|---|---|---|---|---|
| 5,616,945 A | * | 4/1997 | Williams | 257/365 |
| 5,629,608 A | * | 5/1997 | Budelman | 323/268 |
| 5,644,250 A | * | 7/1997 | Ooishi | 326/16 |
| 5,781,062 A | * | 7/1998 | Mashiko et al. | 327/544 |
| 5,917,765 A | * | 6/1999 | Morishita et al. | 365/201 |
| 5,959,927 A | * | 9/1999 | Yamagata et al. | 365/226 |
| 6,107,700 A | * | 8/2000 | Ishikawa et al. | 327/544 |
| 6,140,864 A | * | 10/2000 | Hirata et al. | 327/530 |

FOREIGN PATENT DOCUMENTS

| | | |
|---|---|---|
| JP | 63-065714 | 3/1988 |
| JP | 5-028768 | 2/1993 |
| JP | 6-149394 | 5/1994 |
| JP | 6-084792 | 12/1994 |
| JP | 7-177732 | 7/1995 |
| JP | 11-164550 | 6/1999 |
| JP | 11-340806 | 12/1999 |

OTHER PUBLICATIONS

"Low–power High–speed LSI Circuits & Technology", pp. 61–64, Kabushiki–kaish Realize, Jan. 1998.

* cited by examiner

Primary Examiner—Terry D. Cunningham
Assistant Examiner—Quan Tra
(74) Attorney, Agent, or Firm—Venable; James R. Burdett

(57) ABSTRACT

A semiconductor integrated circuit related to the present invention comprises a logic circuit, and a mode-switching circuit. The logic circuit has a multiplicity of logic elements, which are driven by a driving voltage applied from a dummy power supply line. The mode-switching circuit, during an active mode, supplies to the dummy power supply line a first electric potential for driving a logic element, and, during a sleep mode, supplies to the dummy power supply line a second electric potential, which is higher than zero volts, and lower than a first electric potential. In a first preferred embodiment, a second electric potential is set to a value such that it is possible to reduce logic circuit OFF leakage current during a sleep mode, and to shorten the time for transitioning from a sleep mode to an active mode. In a second preferred embodiment, a second electric potential is set at a value, which reduces logic circuit OFF leakage current during a sleep mode, and at which a latch and flip-flop inside a logic circuit do not lose held data during a sleep mode.

12 Claims, 6 Drawing Sheets

SEMICONDUCTOR INTEGRATED CIRCUIT

BACKGROUND OF THE INVENTION

1. Field of the Invention

The present invention relates to a semiconductor integrated circuit comprising a logic circuit block. More specifically, the present invention relates to an improvement of a semiconductor integrated circuit comprising a circuit for switching an active mode/sleep mode of a logic circuit block.

2. Description of Related Art

The operating speed of a logic circuit block of a semiconductor integrated circuit can be made faster by composing the same of low threshold transistors. However, transistor OFF leakage current increases exponentially in line with a threshold value being made lower. In other words, when a logic circuit block is composed of low threshold value transistors, the operating speed becomes faster, but power consumption increases.

Power consumption of a logic circuit block can be reduced by switching an active mode/sleep mode of the logic circuit block. An active mode is a mode for supplying driving voltage to a logic circuit block, and making this logic circuit operate. Conversely, a sleep mode is a mode in which a driving current is not supplied to a logic circuit block. Since it is possible to lower OFF leakage current when a logic circuit block is not in use by setting the logic circuit block to the sleep mode, the power consumption of a semiconductor integrated circuit can be reduced.

However, two disadvantages as follows occur in an integrated circuit which switches active mode/sleep mode.

During a sleep mode, the electric charge of a power supply line inside a logic circuit block is gradually discharged to a ground, and consequently, the electric potential of this power supply line drops to the ground level. Therefore, when switching from a sleep mode to an active mode, the power supply line inside a logic circuit block must be charged from ground potential to power supply potential. For this reason, the logic circuit block requires a certain degree of charging time after being switched to an active mode until it is capable of being used. This charging time constitutes standby time for other circuit blocks inside an integrated circuit, and consequently, impedes the high speed processing of the integrated circuit.

A logic circuit block generally comprises a flip-flop and a latch for holding data. However, when a logic circuit block is switched to a sleep mode, since the electric potential of the power supply line drops to ground level, these held data are all lost. Conversely, in a case in which it is not desirable for data being held in a latch or flip-flop to be lost, it is not possible to switch to a sleep mode during non-use, and consequently, power consumption cannot be reduced.

SUMMARY OF THE INVENTION

A first object of the present invention is to provide a semiconductor integrated circuit in which standby time, when switching from a sleep mode to an active mode, is short.

A second object of the present invention is to provide a semiconductor integrated circuit in which held data inside a logic circuit block is not lost during a sleep mode.

In order to achieve these objects, a semiconductor integrated circuit related to the present invention comprises a logic circuit having a logic element, which is driven by a driving voltage applied from a dummy power supply line, and a mode-switching circuit, which, during an active mode, supplies to the dummy power supply line a first electric potential for driving a logic element, and during a sleep mode, supplies to the dummy power supply line a second electric potential, which is higher than zero volts, and lower than the first electric potential.

A semiconductor integrated circuit related to the present invention sets a second electric potential to a potential that is higher than zero volts, and lower than a first electric potential. In this manner, the present invention achieves short standby time of the logic circuit when switching from a sleep mode to an active mode, and/or holding data of the logic circuit during a sleep mode.

BRIEF DESCRIPTION OF THE DRAWINGS

Other objects and advantages of the present invention will be explained hereinbelow by referring to the attached figures.

DESCRIPTION OF THE PREFERRED EMBODIMENTS

The embodiments of the present invention will be explained hereinbelow by using the figures. In the figures, the size, shape, and layout relationship of each component are schematically shown only to an extent that enables understanding, and further, the numerical conditions explained hereinbelow are merely examples.

First Embodiment

An integrated circuit related to a first embodiment of the present invention will be explained using FIG. 1 to FIG. 3.

This embodiment is an example of a semiconductor integrated circuit in which a standby time, when switching from a sleep mode to an active mode, is short.

Figure 1:
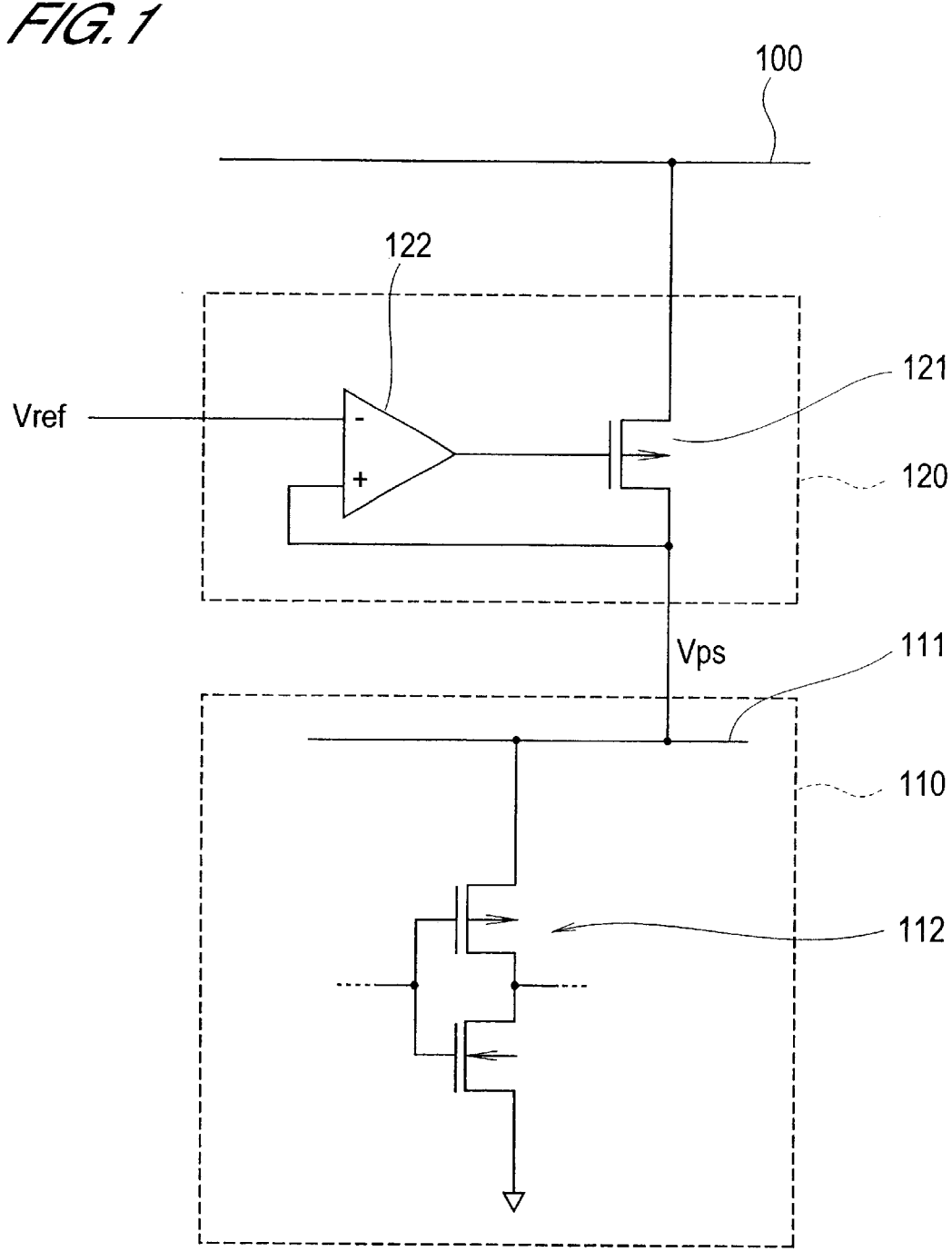
FIG. 1 is a circuit diagram schematically showing the constitution of a semiconductor integrated circuit related to a first embodiment.

FIG. 1 is a circuit diagram schematically showing a constitution of a semiconductor integrated circuit of this embodiment.

As shown in FIG. 1, this semiconductor integrated circuit comprises a power supply line 100, a logic circuit 110, and a mode-switching circuit 120.

Logic circuit 110 comprises one dummy power supply line 111, and a multiplicity of logic elements 112. Dummy power supply line 111 is a power supply line, which is used only inside logic circuit 110. The electric potential Vps of dummy power supply line 111 is switched by mode-switching circuit 120 described hereinbelow. Logic element 112 uses the electric potential Vps of dummy power supply line 111 as driving potential. As the transistors constituting logic element 112, transistors capable of high speed operation, that is, low threshold value transistors are used.

Mode-switching circuit 120 comprises a P-channel type power transistor 121, and an operational amplifier 122. In power transistor 121, a source is connected to power supply line 100, a drain is connected to dummy power supply line 111, and a gate is connected to the output terminal of operational amplifier 122. In operational amplifier 122, an inverting input terminal receives a reference potential Vref, and a non-inverting input terminal receives the drain potential of power transistor 121. The reference potential Vref is generated by a control circuit not shown in the figure. Because high speed operation is not generally required for power transistor 121 or operational amplifier 122, the mode-switching circuit 120 is constituted using a low power consumption transistor, that is, a high threshold value transistor. Thus, in this embodiment, a linear regulator, which changes a potential by switching the value of resistance of power transistor 121, is used as mode-switching circuit 120.

Figure 2A:
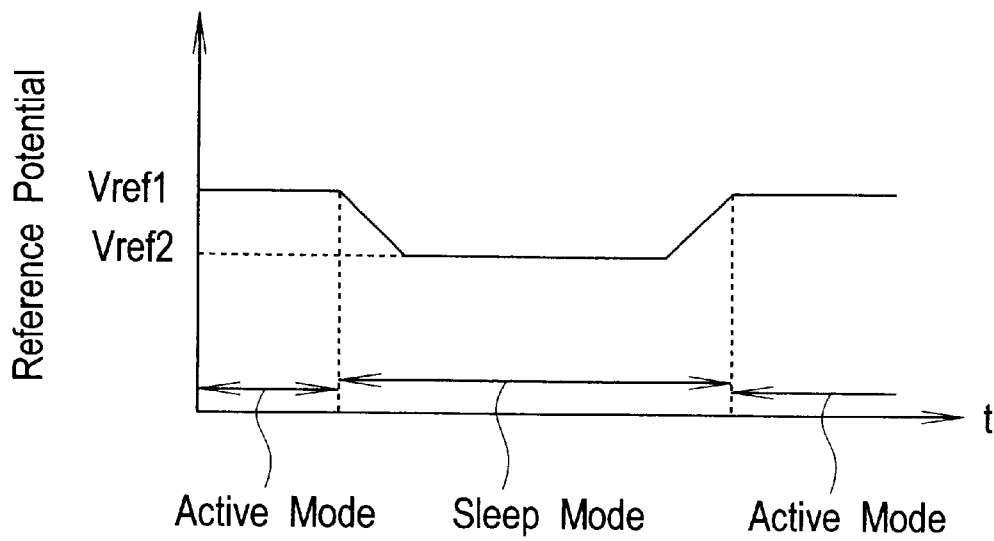
FIG. 2A and FIG. 2B are illustrations of the operation of a semiconductor integrated circuit related to the first embodiment.
Figure 2B:
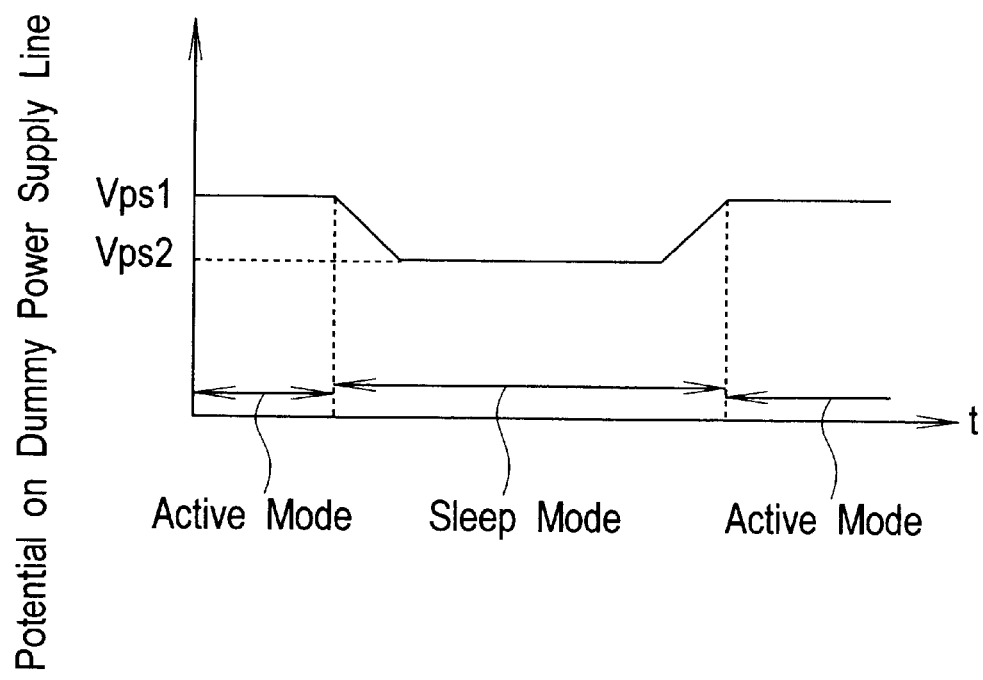
Figure 3:
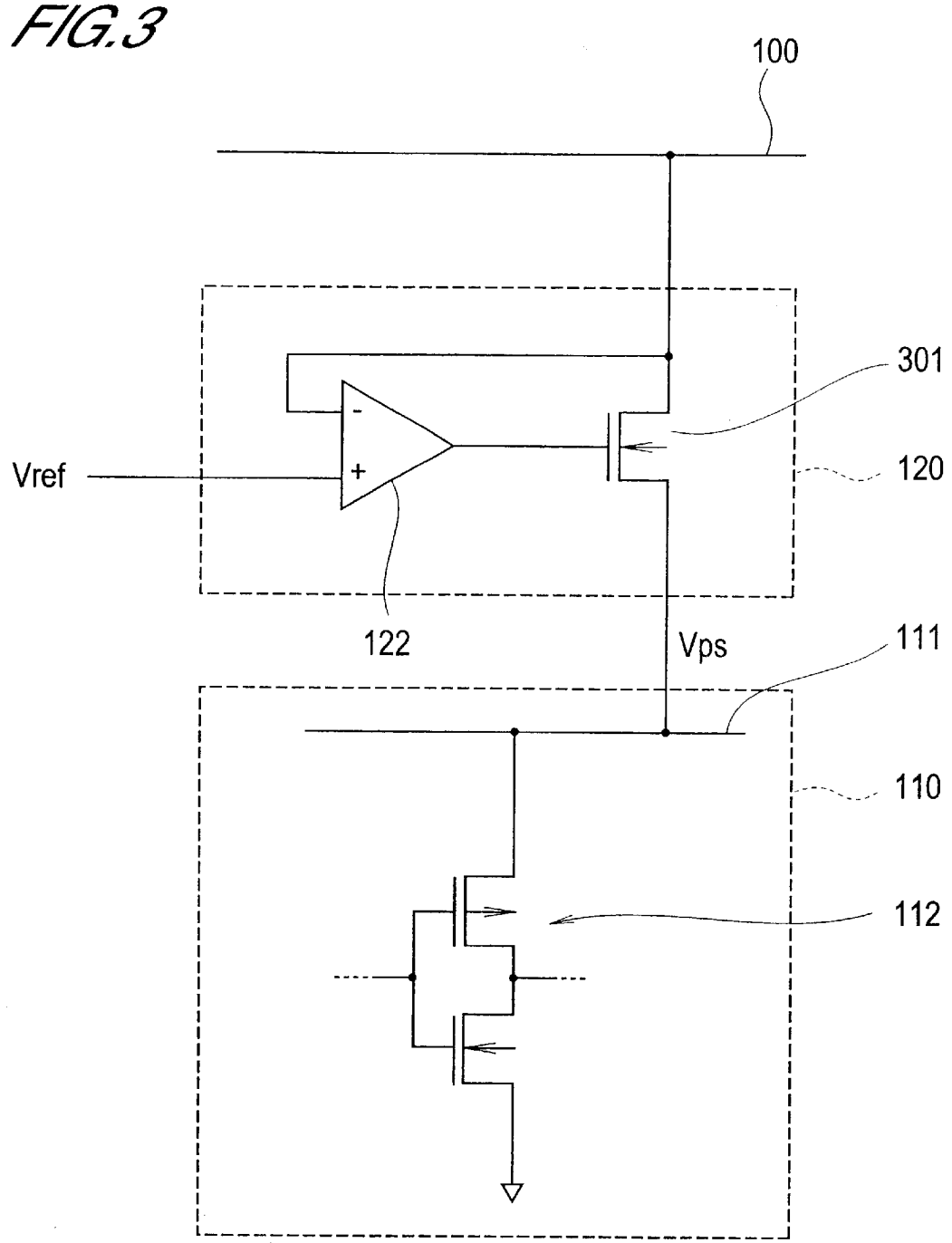
FIG. 3 is a circuit diagram schematically showing an example of another constitution of a semiconductor integrated circuit related to the first embodiment.

FIG. 2 is a timing chart for illustrating the operation of the integrated circuit shown in FIG. 1.

In the case of an active mode, a control circuit not shown in the figure sets the reference potential Vref to high voltage Vref1. This reference potential Vref1 is supplied to the inverting input terminal of operational amplifier 122. Operational amplifier 122 outputs a potential of a value corresponding to Vref1. Power transistor 121 receives this outputted potential at the gate, and supplies to dummy power line 111 a drain potential Vps1 of a value that accords with this gate potential. In the case of an active mode, because a high gate potential is applied to power transistor 121, the drain potential VIPs of power transistor 121 becomes high. Thereby, logic element 112 operates normally, and at high speed.

When transitioning from an active mode to a sleep mode, a control circuit not shown in the figure changes the reference potential Vref to potential Vref2, which is higher than ground potential but lower than voltage Vref1. Reference potential Vref2 is supplied to the inverting input terminal of operational amplifier 122. Operational amplifier 122 changes the output potential to a value corresponding to Vref2. Power transistor 121 receives this outputted potential at the gate, and supplies to dummy power supply line 111 a drain potential Vps2 that accords with this gate potential. Electric potential Vps2 is higher than ground potential but lower than voltage VIPs. The Electric potential Vps2 is set such that the leaking current during a sleep mode becomes sufficiently small, and the time required when transitioning from a sleep mode to an active mode becomes sufficiently short. In accordance therewith, power consumption resulting from OFF leakage current of logic element 112 is reduced.

When transitioning from a sleep mode to an active mode, a control circuit not shown in the figure changes the reference potential Vref from Vref2 to Vref1. Reference potential Vref1 is supplied to the inverting input terminal of operational amplifier 122, and operational amplifier 122 outputs a potential of a value corresponding to Vref1. Power transistor 121 receives this outputted potential at the gate, and supplies to dummy power supply line 111 a drain potential VIPs of a value that accords with this gate potential. In an integrated circuit of this embodiment, the potential of dummy power supply line 111 can reach to VIPs in short time, because the potential of dummy power supply line 111 is set to a potential that is higher than ground potential during a sleep mode. Potential of dummy power supply line 111 reaches Vref1, logic element 112 can operate normally, and at high speed.

As explained hereinabove, because an integrated circuit of this embodiment makes the electric potential of dummy power supply line 111 low during a sleep mode, that is, when a logic circuit is not being used, it is possible to reduce the OFF leakage current of logic element 112, and consequently, it is possible to reduce the power consumption of the integrated circuit.

In addition, because an integrated circuit of this embodiment makes the potential of dummy power supply line 111 higher than ground potential during a sleep mode, the time for transitioning from a sleep mode to an active mode can be shortened.

In an integrated circuit of this embodiment, an N-channel type power transistor can be used instead of P-channel type power transistor 121. FIG. 3 is an example of a constitution of a case in which N-channel type power transistor 301 is used in place of a P-channel type power transistor. In FIG. 3, components to which are assigned the same reference numerals as FIG. 1, respectively, are the same as the circuit of FIG. 1. In a case in which N-channel type power transistor 301 is used, operational amplifier 122 receives a reference potential Vref at the non-inverting input terminal, and receives a drain potential of power transistor 301 at the inverting input terminal. The integrated circuit shown in FIG. 3 operates the same way as the integrated circuit shown in FIG. 1, and has the same technical effect.

Second Embodiment

An integrated circuit related to a second embodiment of the present invention will be explained using FIG. 4 and FIG. 5. This embodiment is an example of a semiconductor integrated circuit in which standby time, when switching from a sleep mode to an active mode, is short, and data held inside a logic circuit block is not lost during a sleep mode.

Figure 4:
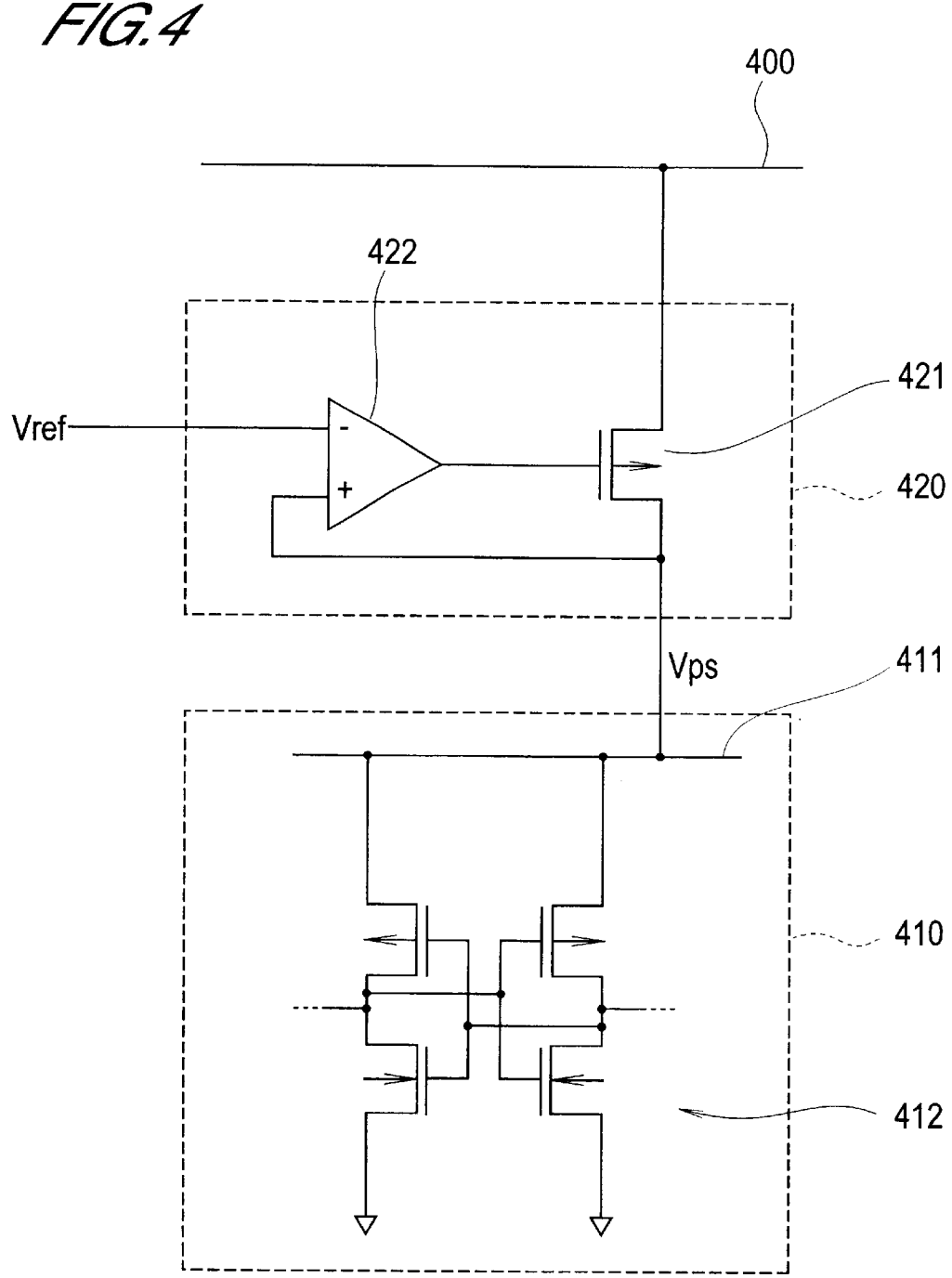
FIG. 4 is a circuit diagrams schematically showing the constitution of a semiconductor integrated circuit related to a second embodiment.

FIG. 4 is a circuit diagram schematically showing a constitution of a semiconductor integrated circuit of this embodiment.

As shown in FIG. 4, this semiconductor integrated circuit comprises a power supply line 400, a logic circuit 410, and a mode-switching circuit 420.

Logic circuit 410 comprises one dummy power supply line 411, and a multiplicity of logic elements. Dummy power supply line 411 is a power supply line, which is used only inside logic circuit 410. The electric potential of dummy power supply line 411 is switched by mode-switching circuit 420 described hereinbelow. A logic element uses the electric potential of dummy power supply line 411 as driving potential. In this embodiment, as one portion of a multiplicity of logic elements, there is used an element for holding data, such as a latch or flip-flop. In FIG. 4, so as to simplify the figure, only a latch 412 is shown as a logic element. As the transistors constituting a logic element, transistors capable of high speed operation, that is, low threshold value transistors are used.

Mode-switching circuit 420 comprises a P-channel type power transistor 421, and an operational amplifier 422. In power transistor 421, a source is connected to power supply line 400, a drain is connected to dummy power supply line 411, and a gate is connected to the output terminal of operational amplifier 422. In operational amplifier 422, an inverting input terminal receives a reference potential Vref, and a non-inverting input terminal receives a drain potential of power transistor 421. The reference potential Vref is generated by a control circuit not shown in the figure. Because high speed operation is not generally required for power transistor 421 and operational amplifier 422, the mode-switching circuit 420 is constituted using a low power consumption transistor, that is, high threshold value transistor. Thus, in this embodiment, a linear regulator is used as mode-switching circuit 420.

Figure 5A:
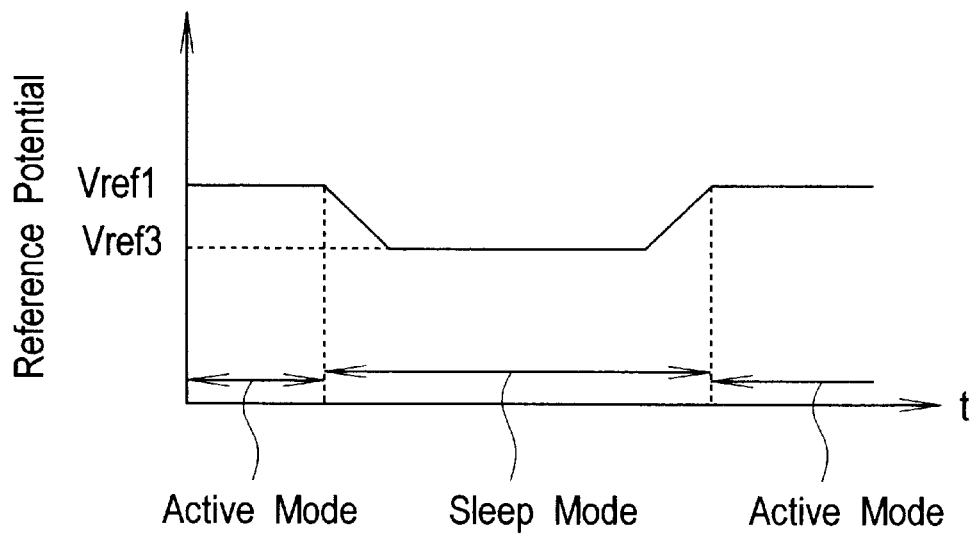
FIG. 5A and FIG. 5B are illustration of the operation of a semiconductor integrated circuit related to the second embodiment.
Figure 5B:
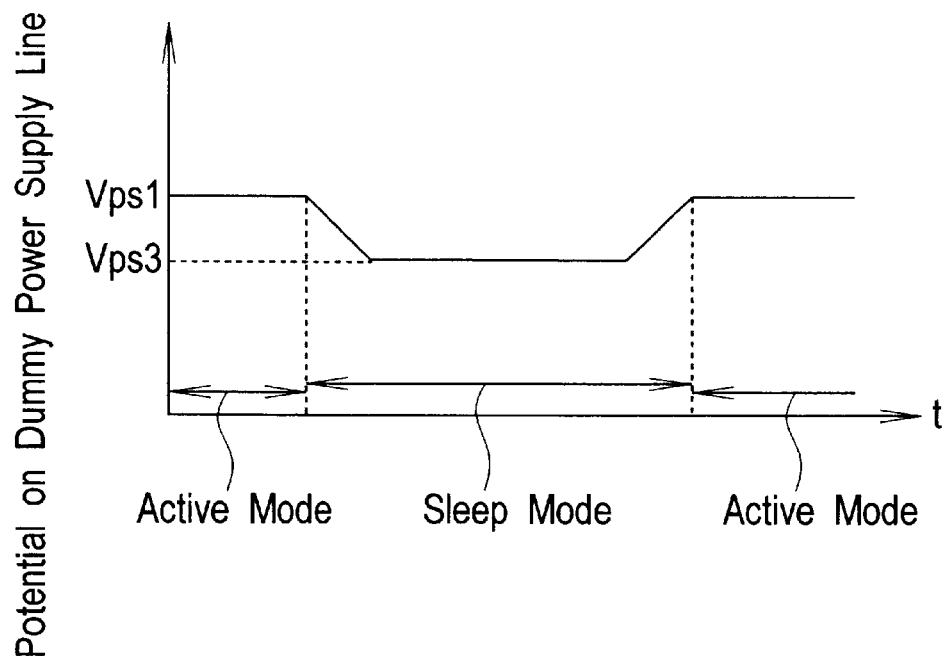

FIG. 5 is a timing chart for illustrating the operation of the integrated circuit shown in FIG. 4.

In the case of an active mode, a control circuit not shown in the figure sets the reference potential Vref to high voltage Vref1. This reference potential Vref1 is supplied to the inverting input terminal of operational amplifier 422. Operational amplifier 422 outputs a potential of a value corresponding to Vref1. Power transistor 421 receives this outputted potential at the gate, and supplies to dummy power supply line 411 a drain potential VIPs of a value that accords with this gate potential. In the case of an active mode, because a high gate potential is applied to power transistor 421, the drain potential of power transistor 421 becomes high. Dummy power supply line 411 supplies driving voltage, that is, high potential to logic element 412. In accordance therewith, logic element 412 operates normally, and at high speed.

When transitioning from an active mode to a sleep mode, a control circuit not shown in the figure changes the reference potential Vref to potential Vref3, which is higher than ground potential and lower than voltage Vref1. Potential Vref3 is set such that the electric potential Vps of dummy power supply line 411 constitutes as low a value as possible within a range in which a data holding element such as latch 412 will not lose held data. To prevent the loss of data held in latch 412 or the like, the value of the electric potential of dummy power supply line 411 must be higher than the sum of the threshold value of the nMOS transistor and the threshold value of the pMOS transistor inside logic circuit 410. Reference potential Vref3 is supplied to the inverting input terminal of operational amplifier 422. Operational amplifier 422 changes the output potential to a value corresponding to Vref3. Power transistor 421 receives this outputted potential at the gate, and supplies to dummy power supply line 411 a drain potential Vps3 of a value that accords with this gate potential. In the case of a sleep mode, because a low gate potential is applied to power transistor 121, the drain potential of power transistor 121 becomes low. Consequently, dummy power supply line 111 supplies a low potential to logic element 412. In accordance therewith, power consumption resulting from OFF leakage current of logic element 412 is reduced. Further, because the electric potential Vps3 of dummy power supply line 411 is higher than the sum of the threshold value of the nMOS transistor and the threshold value of the pMOS transistor inside logic circuit 410, data held in latch 412 or the like is not lost.

When transitioning from a sleep mode to an active mode, a control circuit not shown in the figure changes the reference potential Vref from Vref3 to Vref1. Reference potential Vref1 is supplied to the inverting input terminal of operational amplifier 422, and operational amplifier 422 outputs a potential of a value corresponding to Vref1. Power transistor 421 receives this outputted potential at the gate, and supplies to dummy power supply line 411 a drain potential of a value that accords with this gate potential. In an integrated circuit of this embodiment, because the electric potential of dummy power supply line 411 is set during the sleep mode to Vref3, that is, an electric potential that is higher than the sum of the threshold value of the nMOS transistor and the threshold value of the pMOS transistor inside logic circuit 410, a data holding element, such as latch 412, does not lose data held during the previous active mode. Consequently, logic circuit 410 can continue the same processing as it has been doing prior to transitioning from the previous active mode to a sleep mode.

As explained hereinabove, because the integrated circuit of this embodiment makes the electric potential of dummy power supply line 411 low during a sleep mode, that is, when a logic circuit is not being used, it is possible to reduce the OFF leakage current of logic element 412, and consequently, it is possible to reduce the power consumption of the integrated circuit.

In addition, for an integrated circuit of this embodiment, because a data holding element such as latch 412 does not lose held data even after transitioning to a sleep mode, a logic circuit can continue the same processing as it has been doing prior to the ending of the previous active mode when the transition from a sleep mode to an active mode is made.

In an integrated circuit of this embodiment, an N-channel type power transistor can be used instead of P-channel type power transistor 421. In order to use an N-channel type power transistor, for example, operational amplifier 422 may receive a reference potential Vref at the non-inverting input terminal, while receiving a potential of the power transistor at the inverting input terminal.

Third Embodiment

Next, an integrated circuit related to a third embodiment of the present invention will be explained by using FIG. 6. For this embodiment, the constitution of a mode-switching circuit differs from that of the above-mentioned first and second embodiments.

Figure 6:
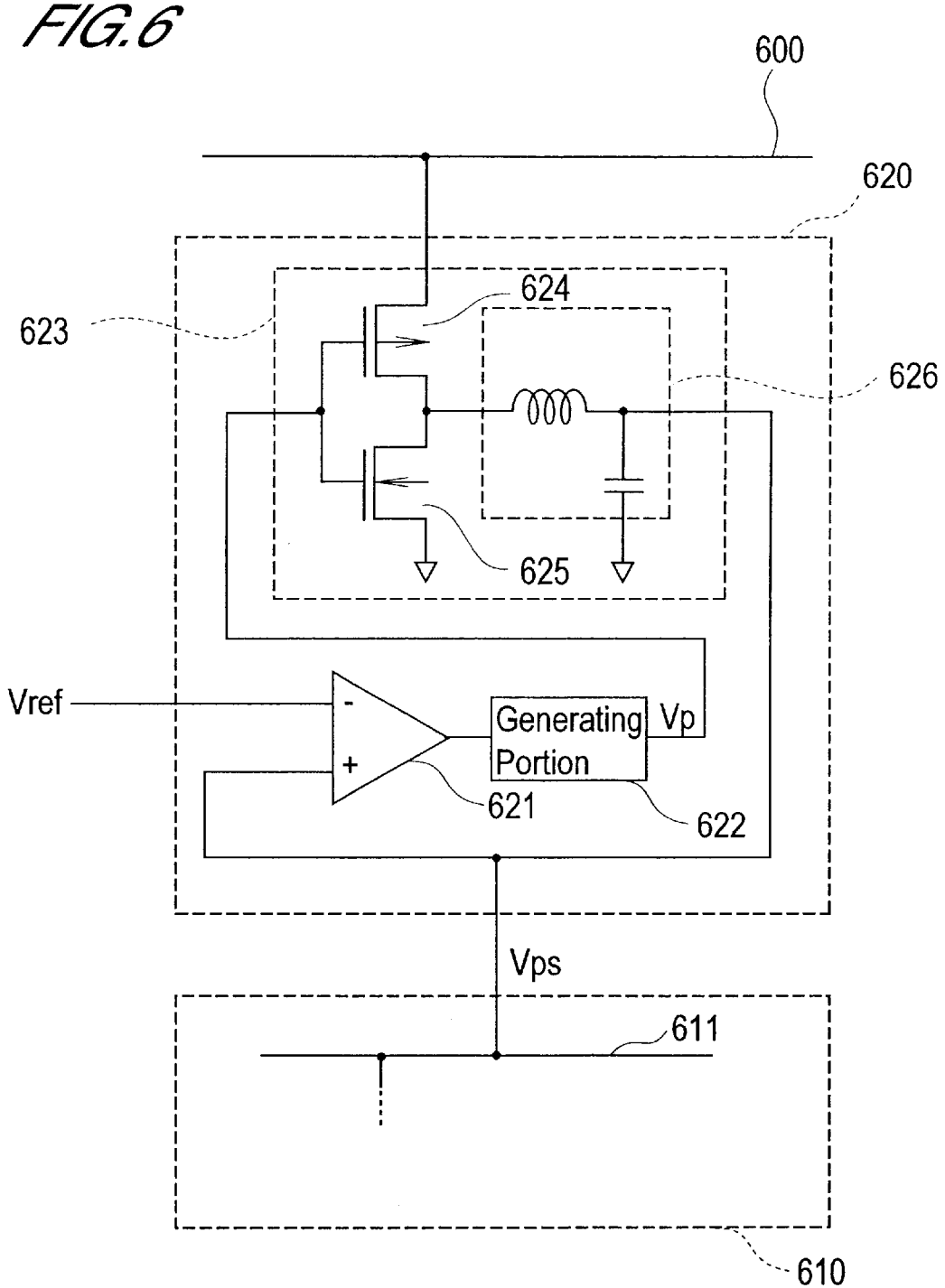
FIG. 6 is a circuit diagram schematically showing a constitution of a semiconductor integrated circuit related to the third embodiment.

FIG. 6 is a circuit diagram schematically showing a constitution of a semiconductor integrated circuit of this embodiment.

As shown in FIG. 6, this semiconductor integrated circuit comprises a power supply line 600, a logic circuit 610, and a mode-switching circuit 620.

Power supply line 600 is the same as power supply lines 100, 400 used in the above-mentioned first and second embodiments.

Logic circuit 610 comprises a dummy power supply line 611 and a multiplicity of logic elements (not shown in the figure). Logic elements inside logic circuit 610 can be same as either logic circuit 110 of the first embodiment, or logic circuit 410 of the second embodiment.

Mode-switching circuit 620 comprises an operational amplifier 621, a switching pulse generating portion 622, and a switch portion 623.

Operational amplifier 621 receives a reference potential Vref at the inverting input terminal, and receives an output potential of switch portion 623 at the noninverting input terminal. And then, operational amplifier 621 outputs a voltage, which accords with the difference of the two inputted voltages. A reference potential Vref is generated by a control circuit not shown in the figure.

Generating portion 622 generates a voltage pulse Vp for supplying to switch portion 623. Generating portion 622 changes the duty ratio of voltage pulse Vp in accordance with the outputted potential of operational amplifier 621.

Switch portion 623 comprises a P-channel MOS transistor 624, an N-channel MOS transistor 625, and a low-pass filter 626. The MOS transistors 624, 625 constitute an inverter. For transistor 624, the source is connected to power supply line 600, and a voltage pulse Vp is inputted at the gate. Further, for transistor 625, the source is grounded, the drain is connected to the drain of transistor 624, and a voltage pulse Vp is inputted at the gate. Low-pass filter 626, as shown in FIG. 6, can be constituted by, for example, one coil and one capacitor. Transistors 624, 625 convert a potential of voltage pulse Vp to a power supply potential, which is supplied from power supply line 600. And then, low-pass filter 626 outputs a direct current electric potential Vps of a value that accords with the duty ratio of a voltage pulse inputted from this inverter. This electric potential Vps is supplied to dummy power supply line 611 inside logic circuit 610, and furthermore, is supplied to the non-inverting input terminal of operational amplifier 621.

Thus, in this embodiment, a switching regulator is-used as mode-switching circuit 620.

In a case in which the electric potential during the sleep mode of an integrated circuit of this embodiment is set to the same electric potential Vref2 as the case of the first embodiment, it is possible to shorten the time required for transitioning from a sleep mode to an active mode. Conversely, in a case in which the electric potential during the sleep mode of an integrated circuit of this embodiment is set to the same electric potential Vref3 as the case of the second embodiment, because a data holding element does not lose held data even after transitioning to a sleep mode, a logic circuit can continue as-is the processing of prior to the ending of the previous active mode when the transition from a sleep mode to an active mode is made.

An integrated circuit of this embodiment is capable of reducing power consumption for the same reason as mode-switching circuits 120, 420 related to the first and second embodiments.

In addition, in this embodiment, because a switching regulator is used, it is also possible to reduce the power consumption of the mode-switching circuit.

What is claimed is:

1. A semiconductor integrated circuit, comprising:
   a logic circuit having a logic element driven by a driving voltage applied from a dummy power supply line; and
   a mode-switching circuit for supplying potential in accordance with a reference potential, to said dummy power supply line;
   wherein, during an active mode in which said logic circuit is driven, said mode-switching circuit keeps the potential of said dummy power supply line at a first potential for driving said logic element, and, during a sleep mode in which said logic circuit is not driven, said mode switching circuit keeps the potential of said dummy power supply line at a second potential, wherein said second potential is lower than said first potential and high enough for a data holding element of said logic element to maintain data held therein, and during said sleep mode, when data storage is needed, said second potential is a first lower potential, which is higher than zero volts and lower than said first potential; and
   when no data storage is needed, said second potential is a second lower potential, which is higher than zero volts, and lower than said first lower potential.

2. A semiconductor integrated circuit, comprising:
   a logic circuit having a logic element driven by a driving voltage applied from a dummy power supply line; and
   a mode-switching circuit for supplying potential in accordance with a reference potential, to said dummy power supply line;
   wherein, during an active mode in which said logic circuit is driven, said mode switching circuit keeps the potential of said dummy power supply line at a first potential for driving said logic element, and, during a sleep mode in which said logic circuit is not driven, said mode switching circuit keeps the potential of said dummy power supply line at a second potential, when data storage is needed said second potential is a first lower potential, which is higher than zero volts and lower than said first potential; and when no data storage is needed, said second potential is a second lower potential, which is higher than zero volts, and lower than said first lower potential.

3. A semiconductor integrated circuit, comprising:
   a logic circuit having a logic element driven by a driving voltage applied from a dummy power supply line; and
   a mode-switching circuit for supplying potential in accordance with a reference potential, to said dummy power supply line;
   wherein, during an active mode in which said logic circuit is driven, said mode-switching circuit keeps the potential of said dummy power supply line at a first potential for driving said logic element, and, during a sleep mode in which said logic circuit is not driven, said mode switching circuit keeps the potential of said dummy power supply line at a second potential when no data storage is needed, wherein said second potential is lower than said first potential and higher then zero volts, and at a third potential when data storage is needed, wherein said third potential is lower than said first potential and high enough for a data holding element of said logic element to maintain data held therein.

4. The semiconductor integrated circuit according to claim 3, wherein said mode-switching circuit is a linear regulator.

5. The semiconductor integrated circuit according to claim 4, wherein said mode-switching circuit comprises:
   a first transistor, one terminal of which is connected to a power supply line, and an other terminal of which is connected to said dummy power supply line; and
   a first differential amplifier, which receives a reference signal at one input terminal, the other input terminal of which is connected to said other terminal of said first transistor, and an output terminal of which is connected to a control terminal of said first transistor.

6. The semiconductor integrated circuit according to claim 3, wherein said mode-switching circuit is a switching regulator.

7. The semiconductor integrated circuit according to claim 6, wherein said mode-switching circuit comprises:
   a first differential amplifier, which receives a reference signal at one input terminal, and an other input terminal of which is connected to said dummy power supply line;
   a switching pulse generator for generating a pulse signal of a duty ratio according to an outputted potential of said first differential amplifier; and
   a switch for supplying to said dummy power supply line a potential according to a duty ratio of said pulse signal.

8. The semiconductor integrated circuit according to claim 7, wherein said switch comprises:
   an inverter for converting said pulse signal to a power supply potential; and
   a low-pass filter for supplying to said dummy power supply line a potential of a value according to a pulse signal duty ratio outputted from the inverter.

9. The semiconductor integrated circuit according to claim 8, wherein said inverter comprises:
   a first transistor, one terminal of which is connected to said power supply line, and a control terminal of which receives said pulse signal from said switching pulse generator; and
   second transistor, one terminal of which is connected to a ground line, a control terminal of which receives said pulse signal from said switching pulse generator, and an other terminal of which is connected to the other terminal of said first transistor.

10. The semiconductor integrated circuit according to claim 9, wherein said low-pass filter comprises:
   a coil, one terminal of which is connected to said other terminal of said first and second transistors, and the other terminal of which is connected to said dummy power supply line; and
   a capacitor, one terminal of which is connected to said other terminal of said coil, and the other terminal of which is connected to said ground line.

11. The semiconductor integrated circuit according to claim 3, wherein said second electric potential is higher than the sum of a threshold value of an nMOS transistor, and a threshold value of a pMOS transistor, which constitute said data holding element.

12. The semiconductor integrated circuit according to claim 3, wherein a threshold value of a transistor which constitutes said mode-switching circuit is higher than a threshold value of a transistor which constitutes said logic circuit.

* * * * *